Feb. 7, 1956 J. T. BECK 2,734,150

CIRCUIT COMPONENT AND METHOD OF MAKING SAME

Filed Jan. 12, 1950

INVENTOR.
JOHN T. BECK
BY Paul, Paul & Moore
ATTORNEYS

United States Patent Office 2,734,150

Patented Feb. 7, 1956

2,734,150

CIRCUIT COMPONENT AND METHOD OF MAKING SAME

John T. Beck, White Bear Lake, Minn., assignor to Beck's Inc., St. Paul, Minn., a corporation of Minnesota Application January 12, 1950, Serial No. 138,245

2 Claims. (Cl. 317—101)

This invention relates to circuit components and methods of preparing the same. In the conventional electrical circuit the circuit is constructed by utilizing an insulating frame which may be of diverse materials, to which there are customarily attached the metallic elements which constitute the electric circuit being constructed. These metallic elements which may be resistors, condensers, impedances, switches and other elements of varying form, such as vacuum tubes and the like, are then connected together by means of electrical conductors, usually of round section, and properly insulated, these electrical conductors being suitably supported by tying them into the insulating structure on which the circuit is built. Circuits of this type are very old, but until very recently this method has been utilized in building almost all circuits.

More recently there have been developed circuits in which some or all of the components are composed of members that are "printed" on an insulating background, usually of ceramic material. While circuits of the printed type do offer advantages of light weight and easy duplication, once manufacturing facilities for their production have been provided, the circuit elements are comparatively fragile and do not readily adapt themselves to the attachment thereto of external leads by soldering or otherwise. Hence, one of the frequent tests utilized in estimating the serviceability of a printed circuit is to immerse the insulating element, with the printed circuit thereon, into a bath of molten solder and then observe the results. Not infrequently the printed on circuit components will peel and dislodge from the underlying insulating material upon which they have been printed. This causes destruction of the circuits, as will be readily appreciated.

Likewise, the effect of humidity and weathering on such circuit components is most pronounced and printed circuits heretofore constructed have not been able to withstand such weathering, particularly in extremely moist or humid climates. In addition, the printed on circuit components are necessarily very thin and relatively non-conductive as compared with usual copper conductors.

It is an object of the present invention to provide an improved circuit capable of being easily manufactured in mass production at low cost.

It is a further object of the invention to provide improved circuit components and methods of producing the same, wherein the circuit components are capable of being produced on very small size equivalent, or nearly so, to printed circuits and yet so constructed so as to resist the adverse effect of weathering, moisture, and deterioration due to the elements.

It is a further object of the invention to provide circuit components and processes of preparing the same, which may be duplicated easily in mass production and at low cost, without sacrificing the high conductivity of copper and without sacrificing the advantages of metallic conductors of chosen type thickness and resistivity which may be varied in accordance with the circuit designs being constructed.

Other and further objects of the invention are those inherent in the apparatus herein illustrated, described and claimed.

The invention is illustrated with reference to the drawings in which corresponding numerals refer to the same parts and in which Figure 1 is a plan view of a circuit which is to be constructed;

Figure 1:
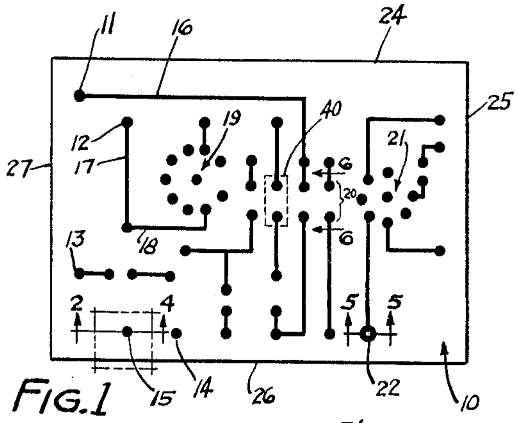

In carrying out the invention there is chosen as a base of the circuit to be constructed, a material 10, shown in the drawings, which is either a hard or compressible insulating substance having preferably heat hardenable characteristics. While ordinary grey or red fiber may be utilized in carrying out the invention in certain of its aspects, its relatively low flowing characteristic renders it less desirable than other insulating materials, such as synthetic resins. Where a heat hardenable resinous sheet is used as the base material 10, it is preferably used in an uncured or partially cured condition so as to be capable of flowing at least slightly during the final curing in a subsequent stage of the process, as will be described. The base 10 thus forms the insulating sheet or base upon which the circuit is constructed.

Figure 5:
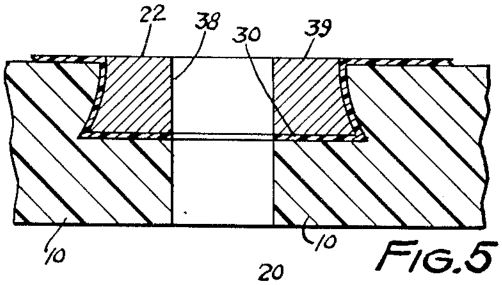
Figure 5 is a sectional view taken along the lines and in the direction of arrows 5—5 of Figure 1 showing another of the circuit components of the circuit shown in Figure 1 and illustrating one of the adaptable features of the instant invention.
Figure 2:
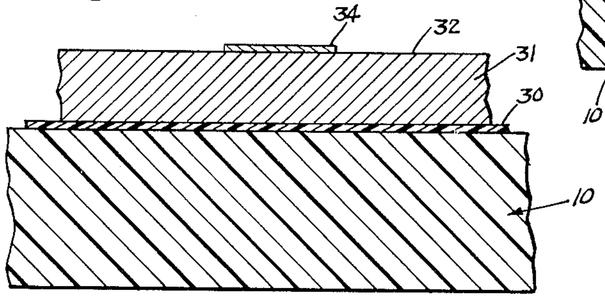
Figure 2 is a sectional view taken along a line such as line 2—4 of Figure 1, showing the formation of the elements composing the circuit during a first stage of manufacture.
Figure 3:
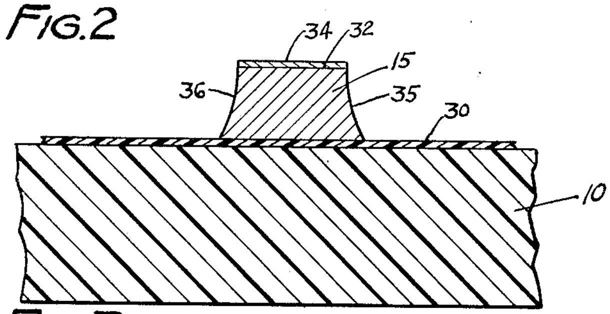
Figure 3 is a sectional view corresponding to Figure 2 but showing the formation of the circuit elements and support therefor during a subsequent stage of manufacture.
Figure 4:
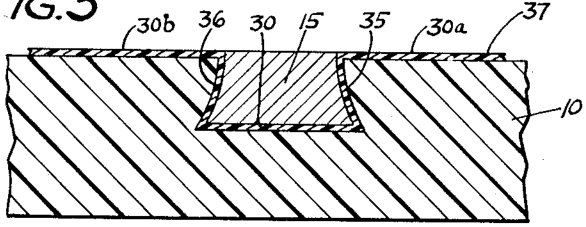
Figure 4 is a sectional view corresponding to Figures 2 and 3 showing an element of a completed circuit produced in accordance with the instant invention.

In Figure 1 the various circuit components are illustrated in shaded lines and consist of many terminals, such as terminals 11, 12, 13, 14 and 15, various conductors 16, 17, 18 and the like, and may be arranged in accordance with the circuit being constructed so as to afford a plurality of contacts arranged in a circle, as at 19, for the construction of a switch on the insulating base, or may provide gaps as at 20, across which resistors, impedances, condensers or other circuit elements are subsequently attached, or may provide spaced connectors as at 21, to which electronic tube circuits or mounting elements may be attached by soldering or otherwise. The design of the specific circuit will be understood to be itself of no bearing upon the instant invention, except as an illustration of the method of preparation of the circuit componnets and the resultant components. The specific spacing and shape and configuration of the conductors, terminals, etc. may be varied to suit any circuit desired without departing from the spirit of the invention. For ease of illustration, Figures 2 through 5 refer to specific circuit components in the composite shown in Figure 1. Thus, Figures 2, 3 and 4 show the circuit component 15 during various stages of its manufacture, whereas Figure 5 shows circuit component 22 in its finished stage.

It will be understood that the circuit is first laid out and the outside dimensions, as indicated by lines 24, 25, 26 and 27 of the base 10, are then determined, and it will be understood further that the base 10 may be of any convenient shape to suit the installation for which the circuit is designed and need not be rectangular in shape as illustrated, but may be circular, oblong or of irregular shape.

In carrying out the method of the invention the insulating base material 10 of sheet form is cut to the appropriate size for the circuit being constructed, or a multiple may be laid out and a great number of units made at one time and later cut apart, and upon it or the multiple lay-out there is then placed a layer 30 of adhesive that can be partially cured during moderate heat and pressure to produce a bonding effect and then later on fully cured to its maximum strength in a later step in the process. Polymerizable resins make excellent adhesives for this purpose. Suitable adhesive resinous materials of this character include vinyl, phenolic, resorcinol, furan, urea, melamine, polystyrene, silicone and polyacrylic ester resins. Many other adhesive cold-setting or thermosetting resins are suitable for this purpose. After the resinous layer 30 has been applied, there is then placed upon the uncured adhesive layer 30 a sheet 31 of conductive material, such as sheet copper, sheet brass, sheet silver, sheet alloy or other conductive material. It will be understood that this conductive sheet can be varied as desired in accordance with the circuit being produced. In most cases ordinary sheet copper of appropriate conductivity serves admirably for the conductors and terminal posts of circuits, but in special applications other conductive metals of greater resistivity may be utilized. The precious metals, such as sheet silver, sheet gold or sheet platinum, are not excluded since they can be used in relatively thin layers and without great expense. It may be pointed out that these metals are recovered, except for that relatively small amount of metal which constitutes the circuit conductors, terminals, etc., during the etching process hereinafter described. The sheet 10 forming the base and the sheet 31 are preferably sanded lightly so as to present good, smooth, clean surfaces to which the adhesive 30 adheres. The metal sheet 31 is then firmly pressed upon the insulating adhesive 30 which is on the insulating base sheet 10 and the whole unit is subjected to heat (if thermosetting resins are used) and to moderate pressure sufficient only partially to cure the resinous adhesive 30. It may be pointed out, however, that the curing of the resinous adhesive 30 should not be carried to the state of completion since in a later stage of the process it is desired to cause the resinous material 30 to flow again when finally cured. Hence, the adhesion produced at the step of the process illustrated in Figure 2 is merely sufficient to hold the sheets 31 and 10 together, during processing.

Upon the upper surface 32 of sheet 31 there is then applied a design which outlines the circuit conductors, terminals, etc. which are desired to be produced on the base sheet 10. In the circuit shown in Figure 1 these circuit connections are as shown in the shaded areas. The outline of the circuit which is thus formed on the upper surface is by means of a material 34 which is a "stop-off" or resistive substance, such as lacquer or paint of a consistency such that it can be rubbed through a silk screen or other screen process stencil so as to produce the circuit outline being manufactured, such as that shown in Figure 1. If desired the circuit outline can be applied through an ordinary stencil or may be printed on, or can be applied through a stencil of thin paramagnetic material that is held in place by magnets underneath sheet 10. For the stop-off material 34 there may be used the same resinous adhesive composition as at 30.

In some circuits, particularly those of minute size, as well as large ones, the stop-off enamel can be placed advantageously in the same manner as for the usual photo-engraving process using light sensitive enamels. In such process the entire metal sheet 31 is coated with a light sensitive enamel which is then exposed through a negative which permits light to fall on the enamel only in areas shown shaded in Figure 1 (i. e. areas 34 of Figure 2 etc.). The exposure to light sets the enamel in a hard, insoluble condition, the remaining enamel being soft and capable of being washed away and is washed away in developing. The enamel (34) thus placed then protects the underlying metal during subsequent etching. This method of placing the protective enamel (34) has been used in producing circuits of minute size, such as the size of a postage stamp.

The material 34 of lacquer or paint should be capable of resisting etching chemicals that are then used to remove the exposed portions of metal 31. After the printed or stencilled or otherwise applied design of the circuit, illustrated by the spot 34 of Figure 2, has been applied, it is permitted to dry, or may be baked, depending upon the particular stop-off paint or lacquer that is utilized. This stop-off material, which is usually a lacquer or paint, is capable of withstanding etching chemicals or an electrolytic etching bath and such stop-off materials are commercially available for all etching processes. The stop-off lacquer or paint design thus stencilled on the upper surface of the metal 31 is the complete outline of the circuits, connections, etc. being manufactured.

The entire composite shown in Figure 2, consisting of the insulating base 10 to which the metal sheet 31 is attached adhesively by the layer 30 and having the circuit components printed, stencilled or otherwise applied to the surface 32 by means of the stop-off paint or lacquer 34, is then placed in an etching bath. The etching bath is selected appropriately for the type of metal composing the sheet 31. Thus, where copper is used, the etching bath may consist of iron chloride and copper sulfate solution or acids, chlorides suitable for the removing of copper. Electric etching baths for the metal or alloy composing the sheet 31 are available on the market and etching techniques are well known. An etching bath appropriate for the metal 31 is selected. The composite shown in Figure 2 is permitted to remain in the etching bath until the metal composing the sheet 31 has been eaten away throughout its exposed areas, as illustrated in Figure 3, wherein the only metal remaining is the metal under the stop-off lacquer 34, which thus forms the element 15. It will be noted that element 15 has slightly outwardly sloping walls at 35 and 36. This feature of the invention, which serves to lock the metal elements of the circuit in place in the final unit, is obtained by timing the etching and controlling the strength of the etching bath so as to produce the outward slope rather than a vertical or undercut surface. When electrical etching processes are used the outward sloping effect is achieved by adjusting the current (voltage). The stop-off lacquer or paint layer 34 remains in place as shown in Figure 3, having protected the upper surface of the sheet at 32 and thus formed the pillar of metal at 15 composing this circuit element. It will be understood that lines or dots of the metal composing the circuit are thus produced at appropriate intervals and spacings over the base sheet 10, and if desired the thus etched circuit elements may then merely be cured with heat to set the adhesive 30 or the unit may be cured between heated platens and then may be used merely by slightly sanding the upper surface 34—32 sufficiently to remove the stop-off lacquer or paint 34, thus exposing a clean, bright upper surface at 32. This is particularly true where the base 10 is incompressible such as fiber. However, when the base sheet 10 is of uncured and compressible and moldable resin, it may be cured with heat and pressure, and this serves not only to cure the adhesive layer 30, but also to force the circuit elements downward into the sheet 10. According to this mode of carrying out the invention, when the sheet 10 is uncured thermosetting the composite unit shown in Figure 3 is placed between heated platens which are pressed together with sufficient force to cause the metal circuit components, exemplified by pillar 15 of Figure 3, to be pressed down into the sheet 10 so as to bring the top surface of the metal level with the top surface of the plastic. The total pressure necessary for this operation need be only moderate since the circuit elements are relatively small and hence, as the base sheet 10 is heated and softens, the elements 15 are gradually settled down into the material 10 forming the base sheet. At the same time the adhesive layer 30 being only parially cured, is softened and flows in and around the metallic circuit elements and to some extent out and across the surface of the sheet 10, as illustrated at 30A and 30B. The heat and pressure of opposed platens is continued until the entire mass composing the sheet 10, the circuit components 15 and the adhesive 30—30A—30B, forms a level, flat component presenting an upper surface at 37 with the metallic circuit elements embedded as in Figure 4, and heat and pressure are maintained until the plastic base sheet 10 and the resinous adhesive 30—30A—30B are completely hardened and set. After this the composite is removed from between the heated platens and is then sanded lightly along the surface 37 so as to brighten the exposed areas of the circuit component 15 and all other metallic circuit components which are likewise exposed on the upper surface of the sheet 10.

The circuit component 22 of Figures 1 and 5 is of somewhat greater area and illustrates how the component can be punched or drilled as at 38, Figure 5, so as to permit the insertion of a conductor from the under side of the sheet 10. Likewise, two components, such as shown in Figure 5, may be placed back to back and a rivet or conductor run through the hole 38 of each and soldered so as to connect two circuits together, where it is desired to have circuits on opposite sides of a planar area 10 or to connect two completed units back to back.

Where desired the component shown in Figure 4 may be coated over with protective lacquer or insulation and the circuit components and anything attached to them may be completely coated so as to be protected from the weather and from deterioration due to moisture or the elements.

It will be understood that after the components, as shown in Figures 4 and 5, are completed, presenting the exposed surfaces of element 15 and of element 22, external connections may be made thereto by soldering directly to these surfaces. Likewise, if desired resistor elements may be sprayed on over the gaps at 20, as illustrated for the area 40 of Figure 1. After the various circuit elements are thus applied and external connections made the entire circuit component may then be dipped in insulating lacquer, or a suitable sheet of insulation may be cemented or bonded to the upper surface of the composite of Figure 1.

Figure 6:
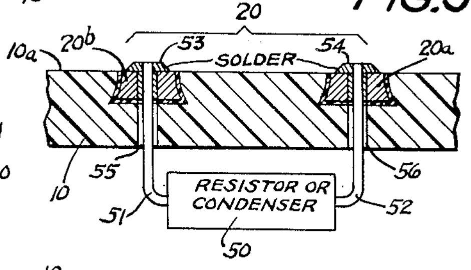
Figure 6 is a fragmentary sectional view in the direction of arrows 6—6 of Figure 1 showing the manner in which a resistor, condenser or other unit is mechanically connected and electrically connected to the circuit component.

When holes are desired through the metal components, this can be done with less strain by drilling or punching the sheets 31 plus 10 at appropriate places when they are initially bonded together and prior to application of stop-off 34 and etching, and this is preferred, although drilling or punching can be done in the final unit of Figure 4. Thus, holes may be punched for all terminals, such as the circular areas of Figure 1, and then the unit is processed as described to provide the circuits. Then, when using the completed unit, wires from external resistors, condensers, vacuum tubs, etc. are bent, as at 51, 52, so they can be entered into the holes from the rear of sheet 10 with the ends of the wires just projecting through face 32 (Figure 4) and the whole unit is dipped with the exposed terminals down into solder and withdrawn. The solder hardens and all connections are hence soldered at one operation. The wires from the external units (viz. resistors, condensers, tubes, etc., serve as mechanical supports for the units and hence the entire unit is mechanically and electrically assembled in one quick soldering operation. This is illustrated in Figure 6 which shows the manner in which a condenser, resistor or other circuit element is mechanically and electrically connected to the circuit component. In Figure 6 the element 50, which is merely illustrative of any circuit element, has two lead wires 51 and 52 which are bent parallel to each other so as to extend through the holes 55 and 56. The wires protrude slightly through the circuit connections 20B and 20A, respectively. The unit 50 and all other units which are thus temporarily inserted into the appropriate holes in unit 10 are then dipped with face 10A down into solder and then withdrawn. The solder adheres to the circuit connections 20A and 20B and to the adjacent portions of wires 56 and 55, respectively, and thus mechanically and electrically joins these elements. An entire circuit diagram can be connected up in this manner with one simple dipping operation. The solder, being in contact with the plastic 10 for such a short time, causes no deterioration of the plastic. It is noted that external resistors, such as 50, are capable of being manufactured to closer tolerances and held closer in use than sprayed or painted on resistors. This quick soldering method is a feature of the invention.

As many apparently widely different embodiments of this invention may be made without departing from the spirit and scope thereof, it is to be understood that I do nt limit myself to the specific embodiments herein.

What I claim is:

1. A circuit component comprising a hardened and set thermosetting resinous sheet having embedded therein areas of electrically conductive metal, said areas having datum peripheral dimensions at the surface of said resinous sheet and similar but slightly enlarged peripheral dimensions at the embedded opposite surface of said metal, the sides of said areas between each surface peripheral edge and its corresponding peripheral edge being outwardly concave, a layer of hard cured resinous material substantially surrounding said embedded areas of metal, and said resinous sheet being firmly bonded thereto.

2. The process of making circuit components which comprises attaching a sheet of conductive metal which is capable of being etched by means of a layer of uncured adhesive material which is thermoplastic when not fully cured and capable of being cured to a hard mass to a base sheet of uncured insulating material which is thermoplastic when not fully cured and capable of being cured to a solid mass, subjecting the base of uncured insulating material, the adhesive layer and the conductive metal sheet to moderate pressure to bond the same together, applying to the exposed metallic surface a stop-off material capable of resisting the eroding effect of an etching bath for said metal, placing the base and metal with the circuit outlined thereon in stop-off material in an etching bath, regulating the etching so as to produce outwardly slanting concave etched walls around each land of metal protected by the stop-off material, permitting the base and metal to remain in said bath until the exposed area of the metal is completely eroded away, thereby leaving elevated lands of metal attached to the underlying base sheet only throughout said areas that are covered by the stop-off material, placing the unit so formed between platens and pressing the unit between said platens under conditions of temperature and heat so as to soften the base sheet and adhesive and pushing the lands of metal down level with the surface of the base sheet and adhesive which flow up around and into bonding contact with said slanting concave etched walls, and simultaneously curing the adhesive and base sheet into a solid insulating mass and thereby firmly attaching the metallic components to the base sheet.

References Cited in the file of this patent

UNITED STATES PATENTS

| | | |
|---|---|---|
| 1,794,831 | Caruso | Mar. 3, 1931 |
| 1,903,778 | Conroy | Apr. 18, 1933 |
| 2,288,735 | O'Connell | July 7, 1942 |
| 2,433,687 | Durst | Dec. 30, 1947 |

(Other references on following page)

UNITED STATES PATENTS

| | | |
|---|---|---|
| 2,443,119 | Rubin | June 8, 1948 |
| 2,447,541 | Sabee | Aug. 24, 1948 |
| 2,481,951 | Sabee | Sept. 13, 1949 |

FOREIGN PATENTS

| | | |
|---|---|---|
| 19,919 | Great Britain | Nov. 5, 1892 |
| 602,492 | Great Britain | May 27, 1948 |

OTHER REFERENCES

New Advances in Printed Circuits: U. S. Dept. of Commerce.

National Bureau of Standards Misc. Publication—192.

Ser. No. 716,984, Patton (Abstract), published Feb. 14, 1950.